United States Patent
Thoma et al.

(10) Patent No.: US 9,347,488 B2
(45) Date of Patent: *May 24, 2016

(54) SEAL-BEARING ASSEMBLY

(71) Applicant: SEAL-RYT CORPORATION, Westfield, MA (US)

(72) Inventors: Lynne A. Thoma, Easthampton, MA (US); Mark R. Wilkinson, Huntington, MA (US)

(73) Assignee: SEAL-RYT CORPORATION, Westfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,197

(22) Filed: Apr. 16, 2014

(65) Prior Publication Data

US 2014/0314346 A1 Oct. 23, 2014

Related U.S. Application Data

(63) Continuation-in-part of application No. 13/799,797, filed on Mar. 13, 2013, now Pat. No. 8,814,432.

(60) Provisional application No. 61/614,614, filed on Mar. 23, 2012.

(51) Int. Cl.
*F16C 17/12* (2006.01)
*F16C 33/74* (2006.01)
(Continued)

(52) U.S. Cl.
CPC ............... *F16C 29/02* (2013.01); *F16C 17/12* (2013.01); *F16C 33/16* (2013.01); *F16C 33/201* (2013.01);
(Continued)

(58) Field of Classification Search
CPC ............... F16J 3/38; F16J 15/26; F16J 15/30; F16J 15/32; F16J 15/56; F16J 17/12; F16J 17/26; F16J 33/18; F16C 2208/32; F16C 2208/44; F16C 2208/52
USPC ........... 384/16, 130, 152, 169, 300, 322, 477, 384/483, 908, 911, 143; 277/300, 338, 342, 277/510, 534, 537, 540
See application file for complete search history.

(56) References Cited

U.S. PATENT DOCUMENTS 1,184,212 A * 5/1916 Reuschline .................... 277/540
2,713,522 A * 7/1955 Petch .............................. 384/16
(Continued)

FOREIGN PATENT DOCUMENTS

EP 681125 A1 * 11/1995 ............... F16J 15/20
EP 0779460 A1 * 6/1997
(Continued)

*Primary Examiner* — Marcus Charles
(74) *Attorney, Agent, or Firm* — Michael I. Wolfson; William H. Dippert

(57) ABSTRACT

A seal-bearing assembly to be inserted into the seal cavity of a mechanical device to provide a seal and a bearing surface to eliminate whip in a rotating and/or reciprocal cylindrical member. The seal-bearing assembly is particularly well suited for use in a reciprocal pump or a piston-driven valve, or between the steam lance and fixed steam tube in a sootblower. The assembly includes at least a pair of outer substantially rigid cylindrical bearings having an inner bore to be positioned over the cylindrical member and at least one complimentary flexible textile packing ring substantially comprised of carbon disposed between the two outer bearing members. In assemblies including an additional bearing, the additional bearing is surrounded by at least one flexible packing on each side. The inner bore of the bearing members provides a bearing surface for eliminating whip of the moving elements in the device.

13 Claims, 5 Drawing Sheets

(51) Int. Cl.
*F16J 15/30* (2006.01)
*F16J 15/20* (2006.01)
*F16C 29/02* (2006.01)
*F16C 33/16* (2006.01)
*F16C 33/20* (2006.01)
*F16C 33/24* (2006.01)
*F16J 15/18* (2006.01)

(52) U.S. Cl.
CPC ............... *F16C 33/24* (2013.01); *F16C 33/74* (2013.01); *F16J 15/30* (2013.01); *F16C 2204/52* (2013.01); *F16C 2208/02* (2013.01); *F16J 15/184* (2013.01); *F16J 15/189* (2013.01)

(56) References Cited

U.S. PATENT DOCUMENTS

| | | | |
|---|---|---|---|
| 2,776,172 A * | 1/1957 | Deitrickson | 384/16 |
| 3,366,425 A * | 1/1968 | Genz | 384/16 |
| 3,439,376 A | 4/1969 | Nelson et al. | |
| 3,646,846 A | 3/1972 | Houghton et al. | |
| 3,907,307 A * | 9/1975 | Maurer et al. | 277/513 |
| 3,920,287 A | 11/1975 | Jamin | |
| 3,923,314 A * | 12/1975 | Lawler et al. | 277/606 |
| 4,054,331 A | 10/1977 | Jamin | |
| 4,289,317 A * | 9/1981 | Kuc | 277/308 |
| 4,394,872 A * | 7/1983 | Schobl | 137/315.28 |
| 4,433,847 A * | 2/1984 | Weinberg | 277/342 |
| 4,548,265 A * | 10/1985 | Luke | 166/140 |
| 4,660,996 A * | 4/1987 | Marshall | 384/138 |
| 4,718,780 A * | 1/1988 | Trudeau | 384/206 |
| 5,090,087 A | 2/1992 | Hipple et al. | |
| 5,217,068 A * | 6/1993 | Newton | 166/84.2 |
| 5,225,262 A | 7/1993 | Leduc | |
| 5,267,533 A | 12/1993 | Smith | |
| 5,370,405 A | 12/1994 | Ueda | |
| 5,370,926 A * | 12/1994 | Hopper | 442/307 |
| 5,383,791 A * | 1/1995 | Hirakui et al. | 439/312 |
| 5,549,305 A | 8/1996 | Freund | |
| 5,687,974 A * | 11/1997 | Wilkinson et al. | 277/537 |
| 6,000,469 A * | 12/1999 | Bassinger | 166/84.1 |
| 6,167,959 B1 * | 1/2001 | Bassinger et al. | 166/84.2 |
| 6,385,956 B1 | 5/2002 | Öttinger et al. | |
| 6,502,382 B1 | 1/2003 | Fujiwara et al. | |
| 6,575,122 B2 | 6/2003 | Hipple | |
| 6,644,007 B2 | 11/2003 | Fujiwara et al. | |
| 6,834,862 B2 | 12/2004 | Wilkinson | |
| 7,011,312 B2 * | 3/2006 | Ishida | 277/342 |
| 7,753,339 B2 | 7/2010 | Yuzawa et al. | |
| 2002/0155304 A1 | 10/2002 | Tanaka et al. | |
| 2007/0230846 A1 | 10/2007 | Tanaka et al. | |
| 2011/0278489 A1 * | 11/2011 | Linser et al. | 251/355 |

FOREIGN PATENT DOCUMENTS

| | | | | |
|---|---|---|---|---|
| EP | 1065674 A2 * | 1/2001 | | |
| GB | 1166253 A * | 10/1969 | | F16C 33/04 |
| JP | 05068876 A * | 3/1993 | | B01J 19/32 |
| JP | 2002129440 A * | 5/2002 | | D02G 3/06 |
| JP | 2003065441 A * | 3/2003 | | F16J 15/22 |
| JP | 2003193083 A * | 7/2003 | | F16C 33/20 |
| RU | 2047030 C1 * | 10/1995 | | F16J 15/16 |

* cited by examiner

SEAL-BEARING ASSEMBLY

CROSS-REFERENCE TO RELATED APPLICATIONS

This application is a continuation-in-part of, commonly assigned U.S. patent application Ser. No. 13/799,797, filed Mar. 13, 2013, now U.S. Pat. No. 8,814,432 issued Aug. 26, 2014, which in turn is based upon and claims the benefit of the filing date of commonly assigned U.S. Provisional Patent Application Ser. No. 61/614,914, filed Mar. 23, 2012, each of which is incorporated herein by reference in its entirety.

FIELD OF THE INVENTION

This invention relates to an improved sealing and bearing assembly for mechanical devices requiring a shaft seal and bearing support, which permits axial, or rotational and axial movement and is positioned in a seal cavity or stuffing box of a mechanical device such as a sootblower, a reciprocating pump, or a piston valve.

BACKGROUND OF THE INVENTION

In mechanical devices, such as pumps driven by a shaft connected to a motor or other means to move fluids, slurries, and the like, the shaft passes through a seal cavity, or a "stuffing box," defined by a cylindrical cavity in the device housing. The shaft is supported by bearings at the motor end. A seal and packing rings are placed in the stuffing box to engage the shaft to prevent fluids and slurries from passing through the seal cavity and reaching the bearings and the motor, causing damage to both.

In fossil fuel burning power plants and similar boilers, soot deposits collect on the heat transfer pipes, and buildup of such deposits can seriously interfere with proper heat transfer efficiency. Such power plants and boilers are provided with sootblower assemblies to clean soot from the exterior of the heat transfer pipes. Such assemblies typically include an elongate hollow tubular lance which has steam or air discharge nozzles adjacent the leading end of the tubular lance, which tubular lance is moved inward into the heat transfer chamber in generally parallel relationship to one or more adjacent heat transfer pipes to eject steam or air against these pipes to dislodge the soot therefrom. The tubular lance in turn is rotatably and axially slidably supported on an elongated and cantilevered stationary steam supply pipe which projects coaxially into the tubular lance. A packing assembly cooperates between the tubular lance and a steam supply pipe to create a sealed relationship therebetween, while at the same time permitting the tubular lance to be axially and rotatably advanced into the heat exchange chamber when removal of soot is desired. Each power plant or boiler typically has a large number of such soot removal, or "sootblower", devices. The tubular lance of each device must be cantilevered inwardly and moved a significant distance, perhaps as much as 40 feet.

In reciprocating pumps having a liquid end and a drive end, a fixed volume of fluid is displaced for each stroke of the drive end. The shaft driven by the drive end has only axial movement and generally operates at higher pressures than rotary pumps, sometimes up to about 10,000 psi. These high pressures present special problems for conventional flexible pump packings. Certain piston-driven valves operate in similar fashion and have similar concerns.

Thus, there is a need for sealing materials that provide an improved bearing surface and sealing environment for sootblowers, reciprocal pumps, piston valves, and other uses and that are chemically, mechanically, and thermally resistant. Accordingly, It is desirable to provide an improved shaft seal-bearing assembly for use in the seal cavity or stuffing box of sootblowers, reciprocal pumps, and piston valves to provide an improved bearing surface and seal.

SUMMARY OF THE INVENTION

Generally speaking, in accordance with the invention, an improved shaft seal-bearing assembly is used in the stuffing box of a mechanical device having a cylindrical member driven axially, or axially and rotationally. The assembly includes a pair of outer substantially rigid cylindrical bearings having an inner bore to be positioned over the cylindrical member and at least one complimentary flexible packing ring disposed between the two outer bearings. The cylindrical bearings, which may be split or whole, are closely dimensioned to fit into the seal cavity of the device with an inner bore of the bearings closely dimensioned to fit over the shaft to provide a bearing surface for the shaft to eliminate whip of the moving elements in the device. At least one flexible packing ring is placed between the two outer bearings. In preferred embodiments of the invention a plurality of packing rings are included between the outer bearings. Preferably, the packing rings adjacent the bearings substantially comprise carbon, and in a more preferred embodiment, the packing rings adjacent the bearings comprise carbon yarn having a purity of at least about 90 percent. The carbon yarns are preferred as they provide strength and heat dissipation together with a wiping action as the shaft reciprocates. The inner packing rings generally may also include carbon yarns or fibers and a lubricant, such as graphite, exfoliated graphite foil, or a dispersion of very fine graphite particles to aid in lubrication.

In reciprocating pumps, a shaft has only axial movement and generally operates at higher pressures than rotary pumps, sometimes up to about 10,000 psi. The first outer bearing of a two-bearing system is installed at the bottom of the stuffing box and sees the highest pressure first. However, due to the clearance some of the system pressure affects an adjacent textile ring. The bearings must not change in geometry to any significant degree so they can completely block incoming pressure. In these applications, the inner packing rings may comprise a braided wire core overbraided with carbon fiber and impregnated with a dispersion containing very fine graphite particles, braided carbon fiber yarn packing with inserted graphite lubricant, or carbon fiber yarn with inserted graphite lubricant overbraided with a single layer of Inconel wire and then with polymeric fibers, adjacent to the outer bearings.

Additional bearings, each one abutted by at least one textile packing or sealing ring, adds both greater load-bearing capability as well as greater sealing surface presented. Having two outer bearings reduces the cantilever effect, thereby limiting the potential for shaft breakage and bearing fracture. It is within the scope of the invention that a stuffing box or shaft seal-bearing assembly may comprise more than two bearings, for example, from 3 to 5, with at least one packing ring between each grouping of two bearings.

Accordingly, it is an object of the invention to provide an improved shaft sealing-bearing assembly to be inserted into the seal cavity or stuffing box of a sootblower, reciprocating pump, or piston valve.

It is also an object of the invention to provide an improved shaft sealing bearing assembly for a reciprocating pump or a piston valve, including at least one packing ring formed from chemical- or abrasion-resistant fibers disposed between two bearing rings or elements.

It is a further object of the invention to provide an improved shaft sealing bearing assembly for a rotary sootblower, wherein one or both of two outer bearings are formed from a high temperature polymeric material.

It is yet a further object of the invention to provide an improved shaft sealing bearing assembly for a rotary sootblower, wherein one or both of two outer bearings are formed from a high temperature imidazole material.

BRIEF DESCRIPTION OF THE DRAWING

For a fuller understanding of the invention, reference is had to the following description taken in connection with the accompanying drawing, in which.

DETAILED DESCRIPTION OF THE INVENTION

Figure 1:
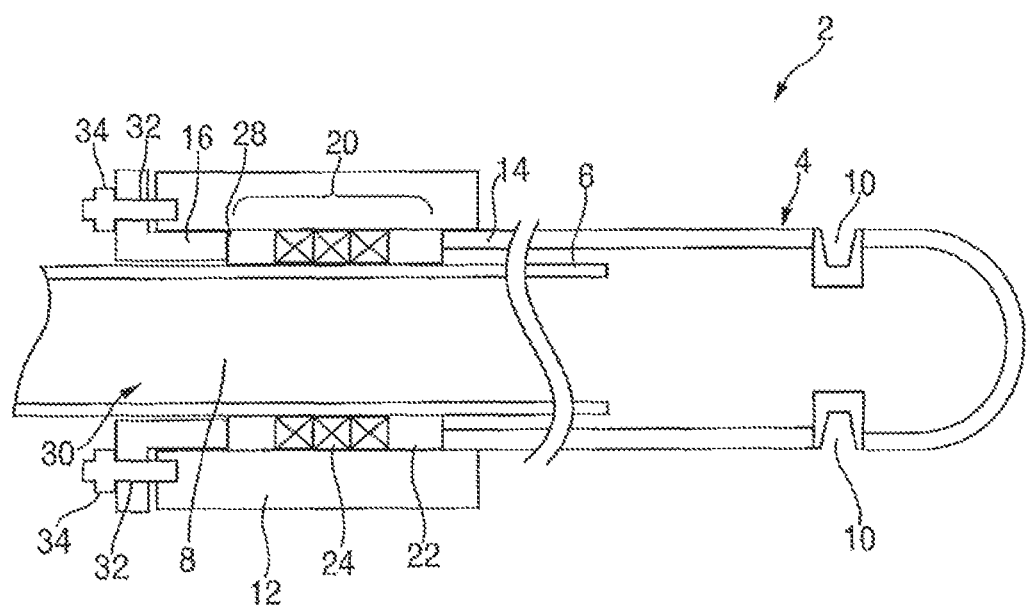
FIG. 1 is a partial cross-sectional view of the distal end of a typical sootblower device with a seal cavity and a seal-bearing assembly installed in the seal cavity.

FIG. 1 is a partial sectional view of the distal end of a sootblower assembly 2 showing an outer tubular lance 4 coaxially positioned for displacement on a steam feed tube 6, wherein outer tubular lance 4 and steam feed tube 6 project into the heat exchange coils of a boiler. Steam feed tube 6 is coaxially positioned within assembly 2 and outer tubular lance 4, and steam from steam feed tube 6 exits outer tubular lance 4 at steam openings 10. A seal cavity or stuffing box 8 defined by a cylindrical outer casing wall 12 is positioned at the proximal end 14 of outer tubular lance 4 and is closed by a gland follower 16. A seal-bearing assembly 20 constructed and arranged in accordance with the invention is positioned within seal cavity 8. Assembly 20 includes a first distal outer bearing or bearing ring 22, flexible packing rings 24, and a second proximal outer bearing or bearing ring 28. The proximal end 30 of seal cavity 8 is defined by gland follower 16 mounted on fixed gland bolts 32 and secured in place by gland nuts 34.

A wide variety of seal and bearing configurations are available to be placed in seal cavity or stuffing box 8 to restrict and limit escape of steam through seal cavity or stuffing box 8. If steam enters seal cavity or stuffing box 8 and migrates from the distal outlet of outer tubular lance 4 or steam feed tube 6, the seals tend to wear and no longer provide a sealing and bearing effect. This causes outer tubular lance 4 to whip and to no longer maintain its axial displacement along steam feed tube 6. Packing rings 24 will be subject to substantial mechanical degradation or degradation due to corrosive action of high temperature steam.

A shaft seal-bearing assembly 20 in accordance with the invention for a mechanical device having reciprocating or reciprocating and rotational movement includes a first outer cylindrical bearing ring 22 at one end of stuffing box 8 with at least one cylindrical textile packing member 24 adjacent to outer cylindrical bearing ring 22 and a second outer cylindrical bearing ring 28 adjacent to the at least one cylindrical textile packing member. As shown in FIG. 1, preferably there are more than one or two cylindrical textile packing members included.

Figure 2:
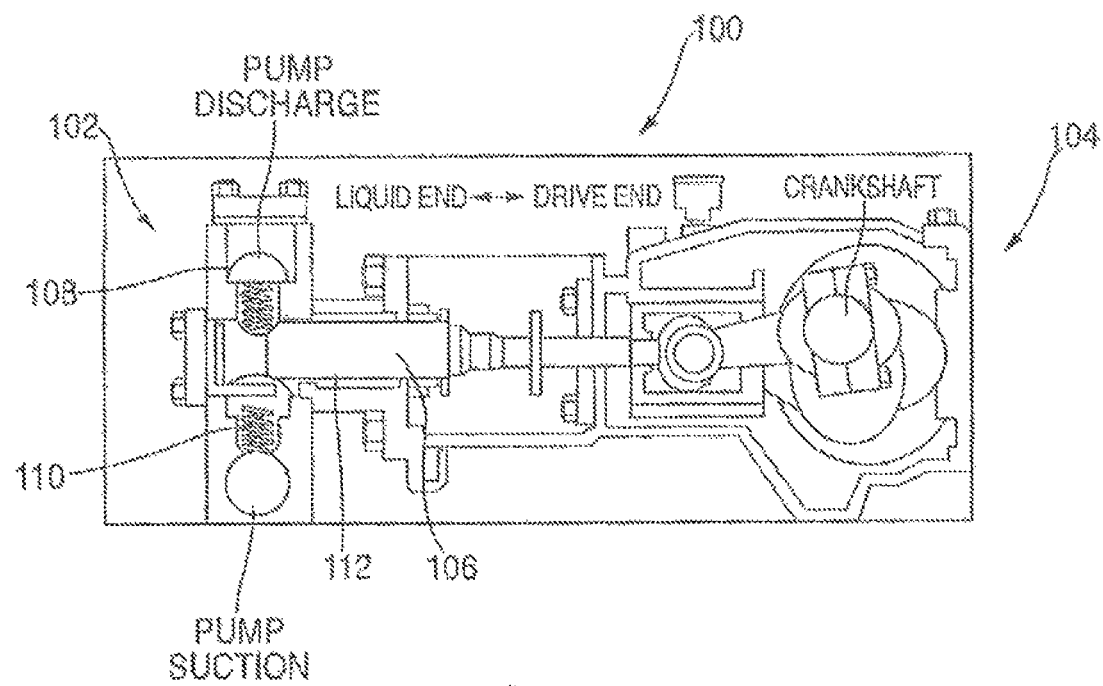
FIG. 2 is a sectional schematic view of a typical reciprocating pump.

FIG. 2. Illustrates a typical reciprocating positive displacement pump 100 having a liquid end 102 and a drive end 104. Liquid end 102 displaces a fixed volume of fluid for each stroke of drive end 104 that drives a shaft 106 in reciprocating fashion. Suction and discharge flow is usually determined by the position of check valves 108 and 110 that are opened and closed by the movement of shaft 106 through a stuffing box 112.

Figure 3:
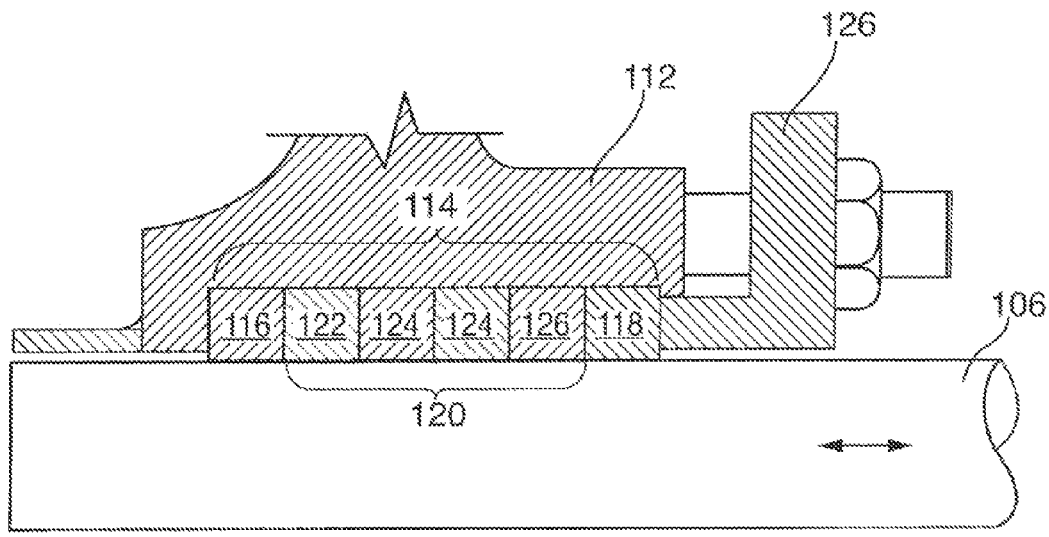
FIG. 3 is a partial sectional view of the stuffing box of a typical reciprocating pump showing the positioning of the bearings and packing.

FIG. 3 is a partial sectional view of stuffing box 112 suitable for use in a reciprocating pump for mining operations having a seal-bearing assembly constructed and arranged in accordance with the invention. Assembly 114 includes a first distal outer bearing 116 and a proximal outer bearing 118. In this embodiment five packing rings 120 are positioned between bearings 116 and 118. This configuration is discussed in detail in Example 1.

Figure 4:
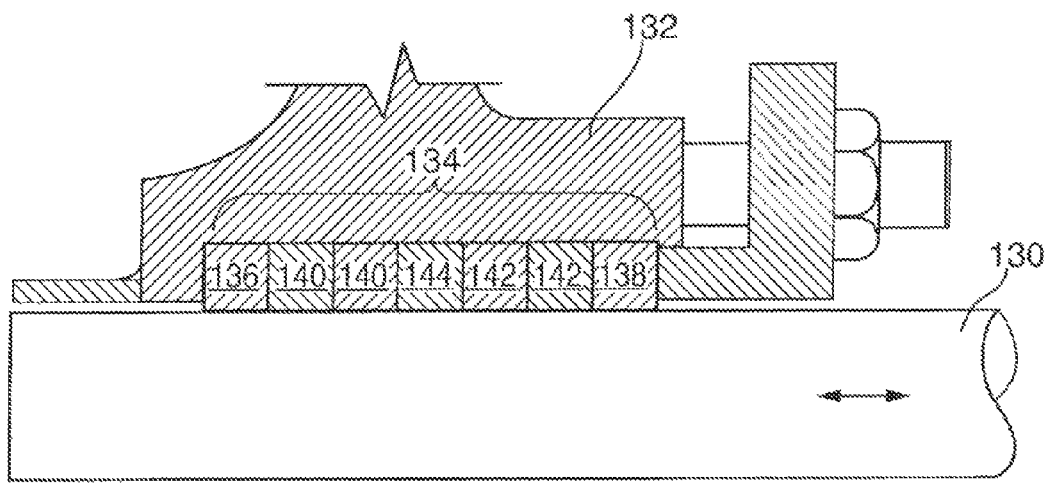
FIG. 4 is a partial sectional view of the stuffing box of a typical sootblower including a seal-bearing assembly with three bearings in accordance with the invention.

FIG. 4 is a partial sectional view of stuffing box 112 suitable for use in a pump with a shaft 130 having reciprocal, or reciprocal and rotational movement and having a stuffing box 132 seal-bearing assembly 134 constructed and arranged in accordance with an embodiment of the invention. Assembly 134 includes a first distal outer bearing 136 and a proximal outer bearing 138. In this embodiment packing rings 140 are positioned adjacent distal bearing 136 and two packing rings 142 are positioned adjacent proximal bearing 138. A third bearing 144 is positioned between the two pair of packings 140 and 142. This type of seal-bearing assembly is useful for those applications requiring additional bearing support to maintain shaft 130. Each bearing may be of the same or a different material and of the same or different dimension.

Figure 5:
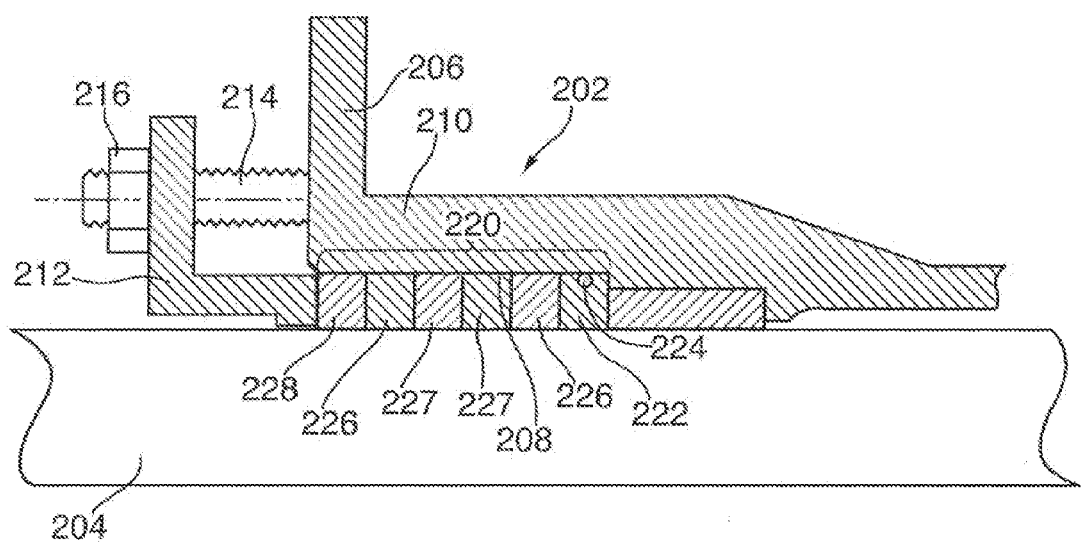
FIG. 5 is a partial cross-sectional view of a piston valve with a seal cavity and a seal-bearing assembly installed in the seal cavity.

FIG. 5 is a partial cross-sectional view of a valve assembly 202 showing a valve shaft 204 coaxially positioned within a casing 206 of valve assembly 202 for reciprocal, or reciprocal and rotational displacement. A seal cavity or stuffing box 208 is defined by a cylindrical outer casing wall 210 and is closed by a gland follower 212 mounted on a bolt 214 and secured by a nut 216 (one shown). A seal-bearing assembly 220 constructed and arranged in accordance with the invention is positioned within seal cavity 208. Assembly 220 includes a first distal outer bearing or bearing ring 222 having an outer O-ring 224, flexible packing rings 226, 227 and a second proximal outer bearing or bearing ring 228.

Figure 6:
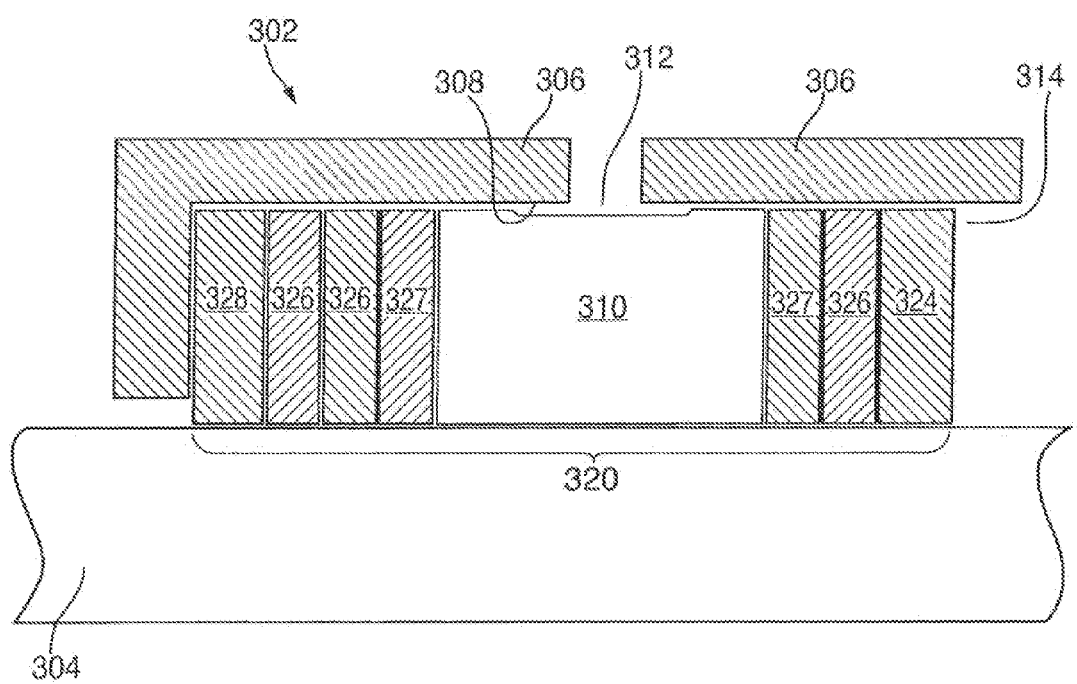
FIG. 6 is a partial cross-sectional view of the stuffing box of a piston valve including a seal-bearing assembly with three bearings and the middle bearing including a lantern ring in accordance with the invention.

FIG. 6 is a partial cross-sectional view of a stuffing box assembly 302 having a bore 308 and surrounding a shaft 304. Stuffing box assembly 302 is defined by a cylindrical outer casing wall 306. A seal-bearing assembly 320 constructed and arranged in accordance with the invention is positioned within seal cavity 314. Bearing assembly 320 includes outer bearings 324 and 328. The outer packing rings 326 are adjacent to each of two outer bearings 324 and 328 and are, for example, a combination of high purity carbon fiber, polymer infused PTFE/carbon, and graphite exfoliant. The inner two packing rings 327 are formed, for example, of an all braided construction with a carbon center around which exfoliated carbon-inserted foil is braided with silky carbon yarn in the corners. The packings are selected in view of the particular chemical applications. Bearing assembly 320 also comprises a center bearing 310 with a lantern ring 312.

Sootblowers are normally run with steam at about 700° F., and it is advantageous to use as packing materials appropriate polymers that will not only function at this elevated temperature but will also absorb just enough moisture to effect a slight swelling in the polymer, allowing it to approximate the shaft diameter and greatly aid in the sealing function as well. Textile selection is based upon those yarns which (1) demonstrate the ability to remain fully viable at temperatures exceeding those experienced in this application, (2) conduct heat, and (3) act as wipers to trap any mechanical displacement of carbon or other particles. Such textiles include materials substantially formed from carbon, such as essentially pure carbon yarns, graphitized yarns, or exfoliated graphite yarns, as well as ceramic yarns, glass yarns, synthetic yearns, etc. A necessary characteristic of these yarns is that they remain dimensionally stable through the axial/rotary action of the shaft. A preferred functional braided packing ring construction is to place high-tensile, low elongation to break carbon fiber yarns in the outer positions with softer graphitized yarns comprising the middle contact positions. Further use of carbon fiber yarns in the core area of the packing aids in overall braid stability. Thus, in the combined axial/rotary movement of the shaft, the carbon fiber yarns act as wipers to trap any mechanical displacement of the graphitized of exfoliant yarns, keeping them in position to effect positive sealing.

Useful bearing material are those that provide suitable chemical, temperature, compressive strength, flexural strength and wear characteristics and can be appropriately machined to yield the desired bearing dimensions and tolerances. Such bearing materials include, but are not limited to polymers including polyphenylene sulfides, polyimidizoles, polyamides, polyimides, polybenzylimidazoles, polyaryl ether ketones such as polyether ether ketones (PEEK) obtained by step-wise polymerization by the dialkylation of bisphenolate salts, polyfluoro polymers such as polytetrafluoroethylene (PTFE) or perfluoroalkoxy (PFA), and formulations containing these polymers in a major proportion.

Useful packing materials are described in the aforementioned U.S. Pat. Nos. 4,298,207, 4,371,180, 4,431,698, 4,559,862, and 5,370,962, the contents of each of which are incorporated herein by reference in their entirety. More particularly, useful materials include, but are not limited to, substantially carbon-containing, mechanically and/or thermally resilient materials comprised of graphite tape, expanded graphite foil, graphite fiber, and/or carbon fiber, as well as polybenzimidazole (PBI) fiber, fibers of fluorinated polymers, such as polytetrafluoroethylene (PTFE) and perfluoroalkoxy polymer (PFA), fibers of polyether ketones, such as polyether ether ketone (PEEK) and polyether ketone (PEK), aromatic polyamide fiber, Inconel or Monel wire, or combinations thereof. In another aspect of the invention, at least one packing member is a material selected from the group consisting of carbon fiber yarns, graphitized yarns, exfoliated graphite yarns, ceramic yarns, and glass yarns. Tension or lip seal rings may comprise the same or different components of the same or different components. The packing rings or members may comprise chemically, mechanically and/or thermally resistant components, whether individually or by combinations thereof, i.e., corner yarns, resilient core, etc. The designs and materials are chosen to resist packing consolidation.

As noted above, in the preferred embodiments, the packing rings adjacent to the outer bearing are formed substantially of carbon, preferably high purity carbon yarn, and may include a minor amount of filler, such as graphite and/or PTFE. The carbon yarn packing provides strength, heat dissipation, and a wiping action. An example of a high purity carbon yarn containing fine graphite particles is Style 317 available from SealRyt Corporation of Westfield, Mass. USA. Another carbon-containing packing containing a combination of high purity carbon yarn and carbon-inserted graphite exfoliated foil is available as Style 357 from SealRyt. An ultra high performance packing for harsh heavy solids applications is a high performance engineering polymer based monofilament pre-twisted with high purity carbon yarn, asymmetric matrix, interbraided, available as Style 2017 from SealRyt.

The inner packing ring members may also include carbon-containing materials, such as a combined packing of pre-twisted polyimidazole and carbon yarns with a center of braided flexible graphite with high purity carbon/graphite filament yarns with support posts of carbon yarn, available as Style 283R from SealRyt. Another packing may be a core of graphite with helically braided Inconel wire overbraided with carbon-inserted exfoliated graphite foil, available from SealRyt as Style 396C.

It is within the scope of the invention that there may be three or more braided packing rings between the two outer bearing rings.

Reciprocating shafts impart "side load" on the sealing rings, a direction which braided rings are not designed to operate in. It is imperative that each ring remains square and does not deform in any quadrant of its cross-section. With regard to the choice of materials, low elongation to break textiles keep the cross-section and the entire matrix dimensionally stable.

In a preferred embodiment of the invention suitable for sootblowers, either or both of the outer bearing rings comprise polybenzimidazole (PBI) as molded material or as fiber. PBI fiber was first derived in 1983 and is a synthetic fiber with an extremely high melting point that also does not readily ignite, because of its exceptional thermal and chemical stability. The Federal Trade Commission definition for PBI fiber is a "manufactured fiber in which the fiber-forming substance is a long chain aromatic polymer having recurring imidazole groups as an integral part of the polymer chain". When used as a fiber to make up a braided packing member, PBI demonstrates superior longevity and sealing capability. While PBI is one suitable constituent, it is not the only such suitable constituents of outer bearings or the braided packing members.

In addition to PBI, the outer bearing rings may comprise other materials that are substantially rigid and are impervious or resistant to corrosive fluids that that may be transported by a pump or may come in contact with a tubular lance or a steam tube in a sootblower. Preferred materials include, but are not limited to, non-ferrous materials, molybdenum/carbon or glass filled thermoplastic material such as PTFE or other suitable polymeric materials.

Each of the plurality of braided packings may form a first annular cylinder defined by the braided packing's inner and outer radii, and the sleeve bearings may define a second annular cylinder having an inner radius that is approximately equal to the braided packing inner radius and having an outer radius that is approximately equal to the braided packing's outer radius.

The inner radius of the stuffing box assembly may be from about 1.00 to about 4.00 inches, preferably from about 1.50 to about 3.50 inches, and the outer radius of the stuffing box assembly may be from about 2.00 to about 5.00 inches, preferably from about 2.50 to about 4.50 inches. The distance or length from the outer surface of the first bearing to the outer surface of the second bearing is from about 3.75 to about 6.00 inches.

In another aspect of the invention, the inner radius of the stuffing box assembly is 2.375 inches, an outer radius of the stuffing box assembly is 3.375 inches, and the length or distance from the outer surface of the first bearing to the outer surface of the second bearing is 4.625 inches. Between the outer bearings there are pluralities of braided packing members that, in alternate embodiments include any of a composition used extensively in industry for a variety of sealing purposes.

A second but also important function of the outer bearings in cooperation with a gland follower 16 is to compress the braided packing members, deforming them radially in response to the compressive forces applied axially. Gland follower 16 is urged axially by the suitable torqueing of gland nuts 34 on gland bolts 32. Torque exerted on gland nuts 34 causes them to rotate. Because the inner radii of the outer bearings are approximately equal to those of the braided packing members and the outer radii of the outer bearings are approximately equal to the outer radii of the braided packing members (i.e., by approximately equal, the application requires less than ten percent difference between the radii of the uncompressed braided packing members and the outer bearings). The rotational motion is converted by the meshing of threads on gland nut 34 and gland bolts 32 to impart a linear motion axially inward, thus converting the torque to a linear force axially inward. In the described fashion, gland follower 24 exerts the compressive force on the braided packing members pressing them inward within the seal cavity into sealing engagement with the tubular lance.

EXAMPLES

The following examples are set forth by way of illustration to help explain the invention, and are not intended to be limiting in any way.

Example 1

A bearing assembly in accordance with the invention suitable for use in a reciprocating device is prepared as follows: Such devices include a piston pump commonly used in the mining industry where slurries carrying abrasive rigid material are being transported. This abrasive material will dictate the type of bearing and packing used in the bearing assembly.

A typical stuffing box of a piston pump is 4.75 inches in depth with a casing having an inner bore of 3.25 inches and a piston shaft with a 2.50 inch diameter. Thus, the cross-section of the bearing assembly is 0.375 inch in length.

A 1.75 inch spring under tension is positioned at the upper end of the stuffing box. The assembly dimensions are: shaft o.d. of 2.50"×bore i.d. of 3.25"×length of 0.375" cross-section so that it fits into the annulus between the piston shaft and the inner bore of the stuffing box casing. The assembly includes a first bearing of an extended wear material, such as polyphenylene sulfide polymer compound 1.125 inches in length, packing and a second bearing on the piston end of the stuffing box 0.75 inches in length. A longer spring side bearing was selected due to the increased pressure on the lower bearing due to the spring. Alternatively, the two rigid bearings can be the same length. The bearings can also be formed of a polyamide/imide material for this end use.

Packing was selected to be abrasion resistant and include carbon fiber to impart structure to the assembly. Specifically, a first lower braided packing of all carbon fiber was positioned against the first lower bearing, two braided backings of 50 percent PTFE-impregnated Aramid yarn/50 percent fiberglass, and a second upper carbon fiber packing. Each packing element is typically 0.375 inches. When installed under tension, the length of the packing element of the bearing assembly is 1.125 inches providing an assembly 3.00 inches in length. Typically, the piston spring is 1.75 inches in length thereby filling a 4.75 inch seal cavity.

When installed in a piston pump transporting slurries containing solid ore particles, the bearing assembly of the two outer bearing elements and selected extended wear and carbon fiber material maintained its shape and the pump performed satisfactorily.

Example 2

A bearing assembly in accordance with the invention suitable for use in the stuffing box of a rotary and reciprocal device such as a soot blower is prepared as follows: Such devices include a horizontally elongate steam supply tube and a horizontally elongate steam discharge lance telescoped axially over the supply tube. Such devices generally operate at temperatures over 600° F.

A typical stuffing box of a rotary soot blower is 3.375 inches in length with a casing having an inner bore of 3.125 inches and an inner supply tube having an outside diameter of 2.375 inches. Thus, the cross-section of the device is 0.375 inches. The bearing assembly includes two outer bearing rings formed of a high temperature polybenzimidazole material with textile packing elements between the bearings.

The assembly includes two outer bearings of a high temperature polybenzimidazole material, each 0.875 inches in length. Packing is placed between the two bearings. The packing includes a first ring of carbon fiber packing, two rings of graphite helically braided with Inconel wire inside and over braided with carbon-inserted exfoliated graphic foil and a second ring of carbon fiber adjacent the second bearing.

Packing was selected to be resistant to the high temperature in the soot blower due to pressurized steam and include carbon fiber to impart structure to the assembly. When installed in the stuffing box, the length of the packing element of the bearing assembly is 1.500 inches.

When installed in a rotary soot blower, the bearing assembly of the two outer high temperature bearing elements and selected carbon fiber media maintained its shape and the soot blower performed satisfactorily.

Example 3

A bearing assembly in accordance with the invention suitable for use in a valve is prepared as follows. Such valves include a straight piston (ram) valve, or a piston with partial rotation. These valves are commonly used in the chemical and pharmaceutical industries to drain or feed non-viscous media from vessels or reactors. The specific media will dictate the type of bearing and packing used in the bearing assembly.

A typical stuffing box of a piston valve as shown in FIG. 5 has the following dimensions:

Shaft($o.d.$)×Bore($i.d$)×Length(inches)=1.875×2.490× 2.000.

The bearing assembly for use in the stuffing box of FIG. 5 was prepared from the following elements:
Bearing 222 with O-ring 224 is PFA w/carbon fiber (0.324" wide);
Bearing 228 is PFA w/long carbon fiber (0.384" wide); and
O-Ring 224 is standard Viton fluoropolymer.

The two outer packing rings 226 adjacent to each of the two bearings 222 and 228 were a combination of high purity carbon fiber and carbon-inserted exfoliated foil. The inner two packing rings 227 were formed of a pretwisted, prebraided dense core and high purity carbon, polymer infused PTFE/carbon, and graphite exfoliant. The packing was selected in view of the particular chemical applications.

The total length of the assembly is 1.938 inches for the stuffing box height of 2.00 inches. The stack height of packing (4 rings/cross section 0.307" each) is 1.23," bearing 228 is 0.384" and bearing 222 with O-Ring 224 is 0.324" in length. The pilot of gland follower 212 is 0.062" resulting in a Total Stack Height=1.230"+0.384"+0.324"=1.938".

When installed in a piston valve stuffing boxy, the baring assembly of the two outer bearing elements, one with an O-ring and selected packings performed satisfactorily.

Example 4

A bearing assembly in accordance with the invention including a middle bearing with a lantern ring suitable for use in a reciprocating pump for metering dimethyl terephthalate is prepared as follows.

A stuffing box 306 surrounding shaft 304 and having an inner bore 308 of 3.250 inches of a piston valve as shown in FIG. 6 has the following dimensions:

Shaft(*o.d.*)×Bore(*i.d.*)×Length(inches)=2.50×3.250×4.500.

A bearing assembly 320 of 4.40 inches in length for use in stuffing box 306 of FIG. 6 was prepared from the following elements:

Outer bearing 324 is 0.375 inch in length and bearing 328 is 0.50 inch in length. Both bearings are polyamideimide but could optionally be PFA w/carbon fiber.

The outer packing rings 326 adjacent to each of two outer bearings 324 and 328 are a combination of high purity carbon fiber, polymer infused PTFE/carbon, and graphite exfoliant. The inner two packing rings 327 are formed of an all braided construction with a carbon center around which exfoliated carbon-inserted foil is braided with silky carbon yarn in the corners. The packings were selected in view of the particular chemical applications.

The total length of assembly 320 includes a center bearing 310 of 1.75 inches in length with a central lantern ring 312 having a length of 0.625 inch. Bearing 310 is polyamideimide.

When installed in a reciprocating pump stuffing box for metering dimethyl terephthalate at elevated temperatures, the bearing assembly consisting of the two outer bearing elements, one central bearing with a lantern ring, and selected packings performed satisfactorily.

It is also to be understood that the following claims are intended to cover all of the generic and specific features of the invention herein described and all statements of the scope of the invention, which, as a matter of language, may be said to fall there between.

What is claimed is:

1. A seal-bearing assembly for a mechanical device having a shaft with reciprocating movement, comprising:
  a first substantially rigid high performance polymeric cylindrical outer bearing;
  a second substantially rigid high performance polymeric cylindrical outer bearing spaced apart from and axially aligned with the first outer bearing; and
  a cylindrical textile packing member including carbon yarn adjacent to each of the first and second outer bearings,
  wherein each cylindrical textile packing member is formed from a combination of at least 90 percent pure carbon fiber and carbon-inserted graphite exfoliated foil, providing a resilient carbon center around which the exfoliated carbon-inserted foil is braided with carbon yarn in the corners.

2. The seal-bearing assembly of claim 1, wherein at least one of the first and second outer bearings comprises high-temperature polymeric material or a formulation thereof.

3. The seal-bearing assembly of claim 2, wherein the first and second outer bearings each comprise a high-temperature polymeric material selected from the group consisting of polyphenylene sulfide, polyimidazoles, fluoropolymers, polyamide-imides, polyimides, polyether ketone polymers, and formulations thereof.

4. The seal-bearing assembly of claim 3, wherein the first and second outer bearings each comprise polytetrafluoroethylene or a perfluoroalkoxy polymer.

5. The seal-bearing assembly of claim 3, wherein the first and second outer bearings each comprise polybenzimidazole or a formulation thereof.

6. The seal-bearing assembly of claim 1, wherein at least one of the first and second outer bearings includes an external O-ring.

7. The seal-bearing assembly of claim 1, wherein the cylindrical textile packing members are formed from at least 90 percent pure carbon fiber.

8. The seal-bearing assembly of claim 1, wherein the cylindrical textile packing material including the carbon yarn may also include yarn selected from the group consisting of graphitized yarns, exfoliated graphite yarns, ceramic yarns, and glass yarns.

9. The seal-bearing assembly of claim 1, wherein the cylindrical textile packing members include a lubricant material.

10. The seal-bearing assembly of claim 1, wherein at least one packing member acts as a wiper to trap any mechanical displacement of carbon or other media particles.

11. The seal-bearing assembly of claim 1, wherein a third substantially rigid cylindrical bearing is positioned between the first and second outer bearings.

12. The seal-bearing assembly of claim 11, wherein at least one cylindrical packing member is positioned between the third cylindrical bearing and each of the first and second outer bearings.

13. The seal-bearing assembly of claim 11, wherein the third cylindrical bearing comprises a lantern ring.

* * * * *